United States Patent [19]

Arnold

[11] Patent Number: 4,869,763

[45] Date of Patent: Sep. 26, 1989

[54] PROCESS AND APPARATUS FOR THE APPLICATION OF A NON-ADHESIVE INSULATING TAPE TO AN ELECTRIC COIL WINDING

[75] Inventor: Ernst Arnold, Buchs, Switzerland

[73] Assignee: Meteor AG, Rueschlikon, Switzerland

[21] Appl. No.: 175,258

[22] Filed: Mar. 30, 1988

[30] Foreign Application Priority Data

Mar. 31, 1987 [DE] Fed. Rep. of Germany ....... 3710639

[51] Int. Cl.⁴ ............ B32B 31/00

[52] U.S. Cl. ............ 156/187; 156/446; 156/468; 242/7.08; 242/7.23

[58] Field of Search ............ 156/184–185, 156/187–188, 443, 446, 468, 475; 242/7.08, 7.15, 7.19, 7.21, 7.23, 56.1

[56] References Cited

U.S. PATENT DOCUMENTS

| | | | |
|---|---|---|---|
| 2,969,888 | 1/1961 | Whiting | 156/468 |
| 3,207,650 | 9/1965 | Toensing | 156/468 X |
| 3,350,255 | 10/1967 | Twigg | 242/56.1 X |
| 3,380,873 | 4/1968 | Angst | 156/446 |
| 3,474,370 | 10/1969 | Lightner | 242/56.1 X |
| 3,559,909 | 2/1971 | Whiteman et al. . | |

FOREIGN PATENT DOCUMENTS

| | | |
|---|---|---|
| 3139496 | 4/1983 | Fed. Rep. of Germany . |
| 568918 | 11/1975 | Switzerland . |

OTHER PUBLICATIONS

German Search Report, No. P37 10 639.2.

*Primary Examiner*—David Simmons

*Attorney, Agent, or Firm*—Burns, Doane, Swecker & Mathis

[57] ABSTRACT

An insulating apparatus for the application of a nonadhesive insulating tape (15) to the winding of an electric coil (8) comprises a first pressure head (2) for receiving an adhesive tape (9) and the non-adhesive insulating tape (15). In an alternative embodiment, a second pressure head (18) is located above the first pressure head (2) and faces the latter; both pressure heads being displaceable from a rest position into a working position. The adhesive tape (9) is fed from a supply roll (10) over a stress relief device (11) and the nonadhesive insulating tape (15) is fed from another supply roll (16), with both tapes (9, 15) being held by suction on a support surface of the corresponding pressure head (2 or 18). Each pressure head (2, 18) is equipped with a blade (3 and 4) for the cutting of the tapes (9 and 15). In the alternative embodiment, after the adhesive tape is bonded to the coil, it draws the insulating tape onto the coil, so that the insulating tape is being wound together with the adhesive tape. After the cutting of the insulating tape (15, 15'), the winding of the insulating tape is completed and fastened by a protruding portion of the adhesive tape which has been cut.

15 Claims, 4 Drawing Sheets

FIG. 4A
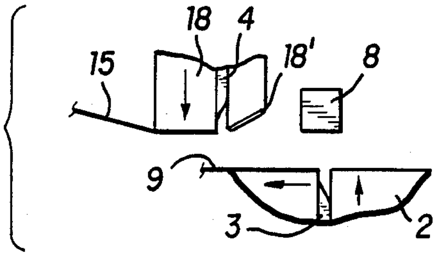
FIG. 4B
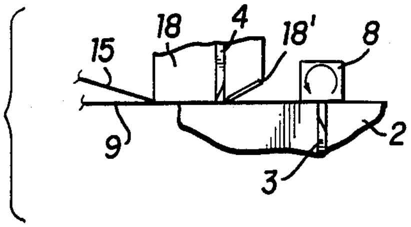
FIG. 4C
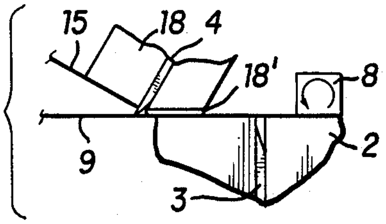
FIG. 4D
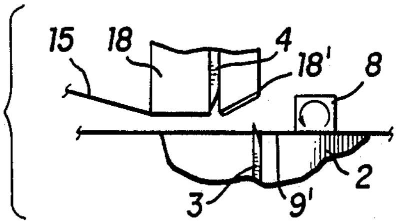
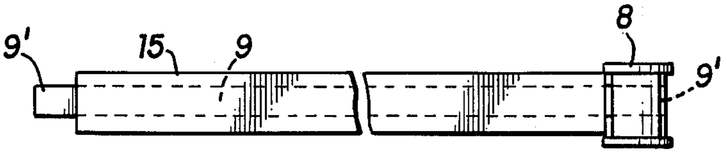
FIG. 4E
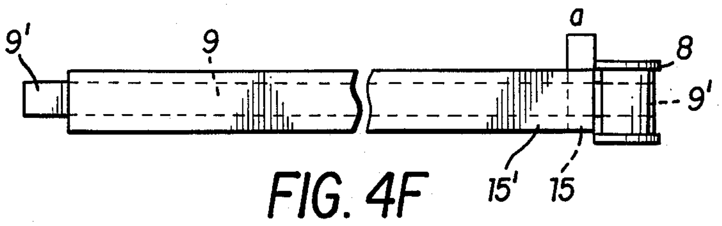
FIG. 4F

PROCESS AND APPARATUS FOR THE APPLICATION OF A NON-ADHESIVE INSULATING TAPE TO AN ELECTRIC COIL WINDING

BACKGROUND OF THE INVENTION

1. Field of the Invention

The invention relates to a process and apparatus for applying a nonadhesive insulating tape to the winding of an electric coil, which is used, in particular, as an intermediate, cover or shielding insulation.

2. Description of the Prior Art

Swiss Pat. Publication No. 568,918 discloses an apparatus for applying adhesive tape to the winding of an electric coil wherein a support, capable of being moved between a rest position and a working position, is provided with a pressure shoe for the adhesive tape. On the support, a slide displaceable between two terminal positions is provided. The slide is equipped with means to draw the adhesive tape during its movement into its terminal position in the direction of the pressure shoe. The slide is also equipped with a blade moving on a path transverse to the direction of motion of the slide, between one terminal position of the slide and the pressure shoe.

However, this insulating apparatus permits only the use of one-sided adhesive tape, manufactured specifically for this type of application. Only a limited selection of such adhesive tapes is available, so that the different insulation requirements, such as those related to electrical properties, temperature resistance and the like, cannot always be satisfied.

In a published German Pat. No., DE 31 39 496, an apparatus for applying sections of a nonadhesive tape to a winding form is disclosed, which, in the case of a multiple spindle winding machine, is integrated with each winding spindle. As the winding time is usually five times the time required for the application of the tape, the tape winding devices are not optimally used, having a utilization factor of about 20%. Furthermore, during the application of the adhesive tape, the winding machine must be inactive so that additional loss of time cannot be avoided. Another disadvantage consists of the fact that both nonadhesive tapes and tapes coated on one side with an adhesive must be rotated around the longitudinal axes by about 90°, primarily because space is considerably limited due to the given spacing of the spindles. This may lead to problems, especially in the case of broader tapes, since irregularly warped tapes may be produced by stressing. Thus, the uniform application of the tape to the coil is no longer assured.

SUMMARY OF THE INVENTION

It is the object of the present invention to develop a process and an apparatus for applying insulation to coil windings independently of the process of winding the coils, using nonadhesive insulating tapes. According to the invention, the appropriate plastic, metal and/or paper tapes can be freely selected to insure optimal insulation. By the careful nonrotating introduction of the tapes, they can be uniformly applied to the coil, in accordance with specific requirements.

A particular advantage of the invention is that the nonadhesive insulating tapes may be chosen in accordance with prevailing conditions.

A further advantage is that a nonadhesive insulating tape with two adhesive ends may be applied stepwise to the coil winding, or a nonadhesive insulating tape may be applied continuously and simultaneously with an adhesive tape.

For specific purposes, nonadhesive insulating tapes consisting of different materials may be combined and processed together. For example, plastic/metal tapes drawn from individual supply rolls may be processed together.

BRIEF DESCRIPTION OF THE DRAWINGS

Other features and objects of the invention will become more apparent from a reading of the Detailed Description in conjunction with the drawings in which.

DETAILED DESCRIPTION

Figure 1:
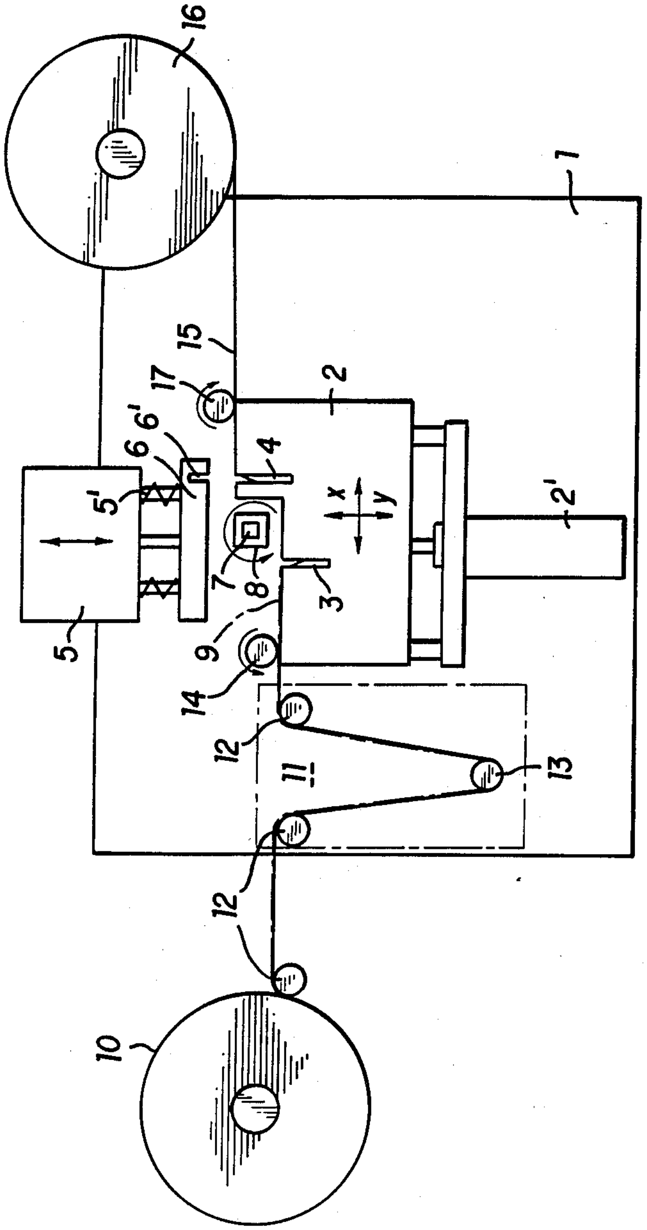
FIG. 1 is a view of an insulating apparatus.

In FIG. 1, (1) designates a housing, containing a known drive for a rotating coil holder (7) and a pneumatic control device.

A pressure head (2) having a blade (3) for cutting a tape (9) adhesively coated on one side and a blade (4) for cutting a nonadhesive insulating band (15), may be displaced in X and Y axes and actuated pneumatically. Above the coil (8), a vertically guided counter holder (5) is provided. The counter holder is equipped with a slide (6) comprising a recess (6') for the blade (4). The slide is elastically supported against the coil (8) by the spring (5,). An adhesive tape (9) is drawn from a supply roll (10) to the adhesive tape stress relief installation (11). Tape stress relief installation (11) consists of three reversing rolls (12) and a vertically displaceable stress roll (13), to form a loop of the tape. The tapes (9, 15) are guided over support surfaces of the pressure head (2) and held by means of vacuum suction nozzles (not shown). From a second supply roll (16), a nonadhesive insulating tape (15) is drawn off and guided directly to the support surface of the pressure head (2). A return stop (14) acting against the support surface of the pressure head (2) prevents the withdrawal of the adhesive tape (9), and another return stop roll (17), also acting against the support surface of the pressure head (2), prevents the withdrawal of the nonadhesive insulating tape (15) during the displacement of the pressure head (2) in the horizontal direction of the X axis.

The apparatus is operated in individual process steps according to FIGS. 2A–G and 2H.

Position A

Figure 2A:
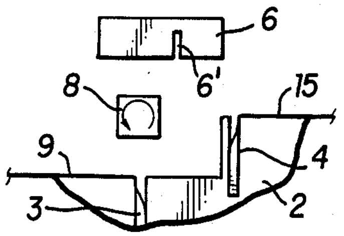
FIG. 2A–H are schematic operating diagrams of the apparatus according to FIG. 1.

As shown in FIG. 2A, the single side adhesive tape (9) drawn from the first supply roll (10), and the nonadhesive tape (15) drawn from the second supply roll (16) are moved into the so-called starting position in the area of an already wound electric coil (8), and held by suction on the pressure head. The adhesive tape (9) is oriented with its adhesive surface facing the coil (8).

Position B

Figure 2B:
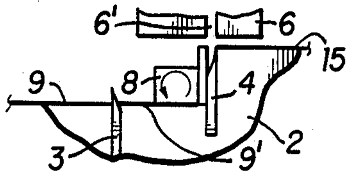
Figure 2C:
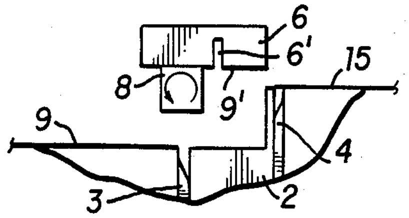
Figure 2D:
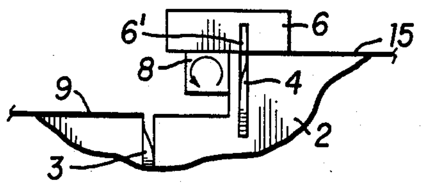
Figure 2E:
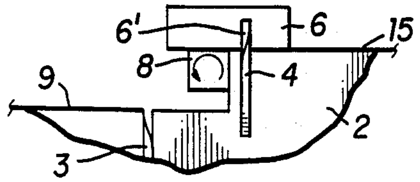
Figure 2F:
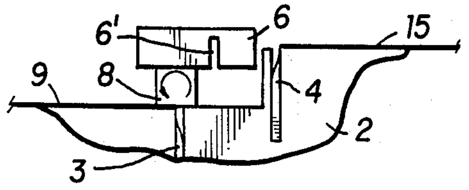
Figure 2G:
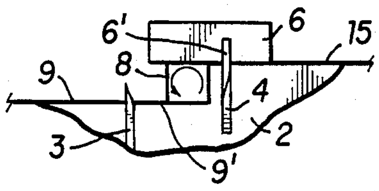

As shown in FIG. 2B, the pressure head (2) is moved by pneumatic cylinders (2,) against the coil (8), so as to press and bond the adhesive tape (9) partially onto the circumference of the coil winding. Subsequently, the coil (8) rotates against the force of the pneumatically actuated pressure head (2) in a counterclockwise direction by approximately 270°. The pressure head (2) is simultaneously displaced into a laterally offset parting position, and the blade (3) cuts off a piece (9') of the adhesive tape protruding from the coil (8).

Position C

The pressure head (2) returns into its starting position (FIG. 2C) and the coil (8) rotates with the freely protruding piece (9') of the adhesive tape by 180° in the counterclockwise direction, so that the adhesive surface of the piece (9') of the adhesive tape points toward the nonadhesive insulating tape (15), whereupon the slide (6) is applied against the coil (8).

Position D

The pressure head (2) is raised in its laterally offset position (FIG. 2D), so that the ends of the tapes (9) and (15) face each other. The pressure head (2) thus pressures the nonadhesive insulating tape (15) against the adhesive surface of the protruding adhesive tape piece (9').

Position E

The pressure head (2) moves back into its starting position and the coil (8) rotates in the counterclockwise direction by a predetermined number of turns, thus winding the nonadhesive insulating tape against the spring force of the slide (6) onto the coil (8). Subsequently, the pressure head (2) again moves from its starting position into its laterally offset cutting position (FIG. 2E) and applies pressure to the insulating tape (15) and the slide (6), whereupon the blade (4) cuts the insulating tape (15).

Position F

The pressure head (2) again moves back into its starting position (FIG. 2F), so that the adhesive tape (9) comes to rest under the already insulated coil (8). The pressure head (2) presses and bonds the adhesive tape (9) partially to the circumference of the insulated coil (8).

Position G

The tape (8) rotates in the counterclockwise direction (FIG. 2G) against the spring force of the pressure head (2) and the slide (6), to wind the adhesive tape (9) by about 360° and attach the end of the insulating tape (15) to the coil (8). Simultaneously, the blade (3) cuts the adhesive tape (9) at a slight distance from the coil (8), and the overlapping end (9') of the adhesive tape is wound by further rotation onto the insulated coil (8).

Figure 2H:
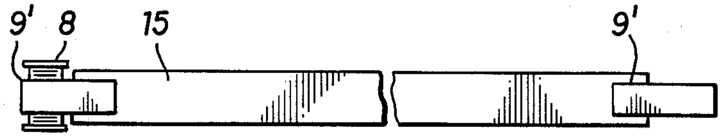

According to FIG. 2, therefore, a nonadhesive insulating tape is applied in steps to the coil winding by means of two ends (9') of the adhesive tape as shown in FIG. 2H.

Figure 3:
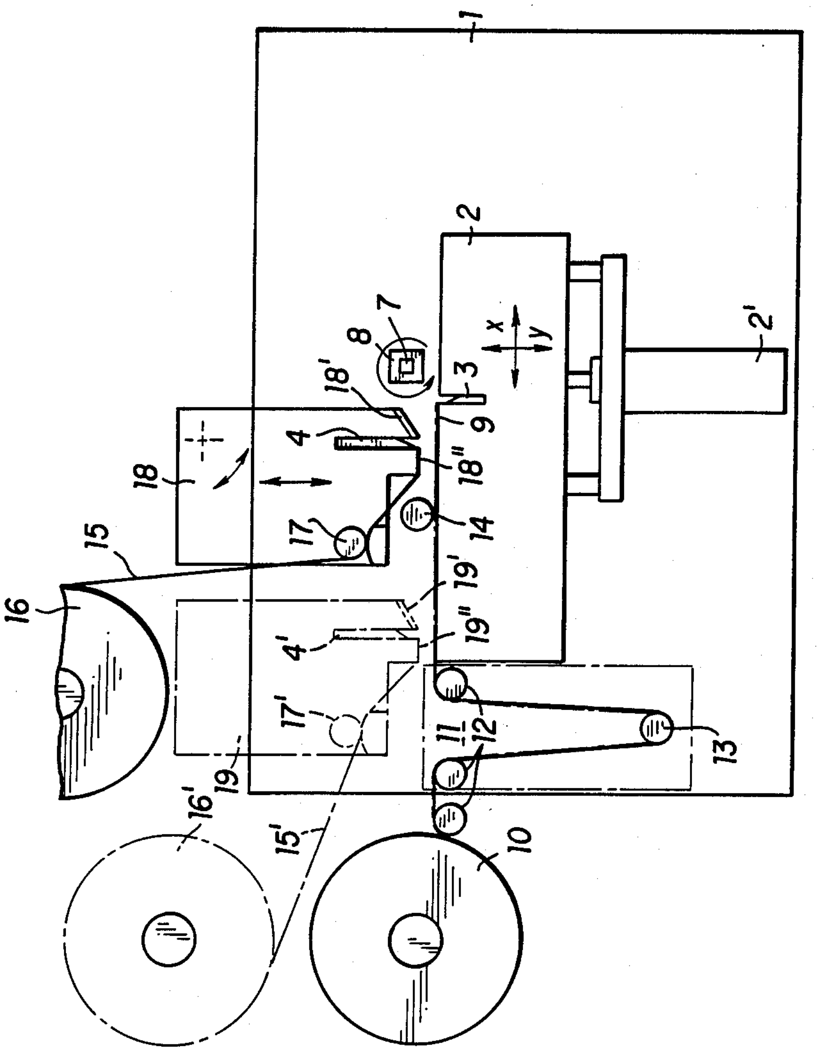
FIG. 3 is a view of a modified insulating apparatus according to FIG. 1, and FIGS. 4A–F are schematic operating diagrams of the apparatus according to FIG. 3.

An advantageous variant is obtained according to FIG. 3, with an insulating apparatus whereby both the adhesive tape (9) and the nonadhesive insulating tape (15) are supplied to the apparatus from one side, bonded together and applied simultaneously and continuously to the coil winding.

Identical parts are indicated by identical reference symbols in FIG. 1 and 3.

In contrast to FIG. 1, in place of the counter holder (5) with the elastically mounted slide (6), a second pressure head (18) with a blade (4) is provided for the nonadhesive insulating tape (15). Pressure head (18) is displaceable and also pivotable, and comprises a sliding surface (18') in addition to the support surface (18"). The nonadhesive insulating tape (15) is held in a manner similar to the pressure head (2); i.e., by suction on the support surface (18") of the pressure head (18) (not shown). The adhesive tape feeding device is similar to that of FIG. 1. The nonadhesive insulating tape (15) is drawn off the supply roll (16) and moved to the pressure heads (2, 18) in a manner such that the insulating tape (15) comes to rest at a distance above the adhesive tape (9).

It is also possible to use several nonadhesive insulating tapes, by drawing the tapes from several supply rolls. For example, a second tape supply (16') and pressure head (19), shown in broken lines in FIG. 3, could be added in conjunction with supply (16) and pressure head (18). Two nonadhesive insulating tapes (15, 15,) would be fed to the appropriate pressure heads (18, 19), the pressure heads having associated sliding surfaces (18', 19'), blades (4, 4') and return stops (17, 17'). An insulating apparatus so configured makes it possible to use composite insulations, for example plastic/metal tapes.

It is also possible, preferably on production lines in which the coils may be freely transported from one station to another, to apply only the insulating tape (15) as an intermediate insulator. The insulating tape (15') is then applied as the cover insulation to the coil (18) only following the completion of the winding process. Here, the insulating tapes (15, 15') may consist of different materials, such as plastic, metal or paper.

The apparatus according to FIG. 3 is operated in individual process steps according to FIGS. 4A–E.

Position A

As shown in FIG. 4A, the single side adhesive tape (9) drawn from the first supply roll (10), and the nonadhesive insulating tape (15) drawn from the second supply roll (16), are moved into the starting position in the area of an already wound coil (8) and held by suction on the corresponding support surface of the pressure heads (2, 18). The adhesive tape (9) comes to rest with its adhesive surface facing both the coil (8) and the nonadhesive insulating tape (15).

Position B

The pressure head (2) moves against the coil (8) (FIG. 4B) so as to press and bond the adhesive tape (9) partially to the circumference of the coil winding of the coil (8). Subsequently, the coil (8) rotates in the counterclockwise direction against the force of the pneumatically actuated pressure head (2). After a rotation of about 270°, the second pressure head (18) pivots with the nonadhesive insulating tape (15) held by suction, against the adhesive surface of the adhesive tape held by suction on the pressure head (2). The adhesive tape (9) is thereby bonded continuously to the nonadhesive insulating tape (15).

Position C

The coil (8) continues to rotate in the counterclockwise direction (FIG. 4C) as the first pressure head (2) is being moved laterally into the cutting position. Simultaneously, the second pressure head (18) is pivoted into the cutting position, so that the nonadhesive insulating tape (15) runs off over the sliding surface (18,) and the blade (4) cuts the insulating tape after a predetermined length has been fed.

Position D

The pressure head (18) for the insulating tape (15) pivots back into its starting position (FIG. 4D) and the coil (8) continues to rotate until the nonadhesive insulating tape (15) is wound completely onto the coil (8). At this point an end (9′) protruding over the coil (8) of the adhesive tape is present, which is then cut by the blade (3) and applied to the coil (8) upon the further rotation of the latter, whereby the insulating tape (15) is attached to the coil (8).

Therefore, according to the operation of FIGS. 4A–D, a nonadhesive insulating tape is applied continuously to the coil winding by means of two ends (9′) as shown in FIG. 4E. If two or more nonadhesive insulating tapes are used, such as the two tapes (15, 15′) of FIG. 3, an additional pressure head (19) is used, as mentioned above. The two nonadhesive insulating tapes are applied to the coil winding (8) as shown in FIG. 4F. The corresponding process steps are, for the most part, identical with the operating mode described relative to FIGS. 4A–D, whereby, as a rule, the insulating tape (15′) drawn from the supply roll (16′) is initially moved to the pressure head (19), pressed and bonded to the adhesive tape (9), and drawn in by the rotation of the coil (8). Thus, the overlap (a) in FIG. 4F required for the adhesive bonding of the two insulating tapes (15, 15′) to the adhesive tape is relatively small.

The processes and the devices of the present invention are not restricted to the winding of electric coils. Other cylindrical bodies with arbitrary cross sections may also be insulated in this manner. The nonadhesive insulating tape or tapes may also be inserted together with the adhesive tape between the individual winding layers of said bodies.

Accordingly, although the present invention has been fully described by way of example with reference to the accompanying drawings, it should be noted that various changes and modifications will be apparent to those skilled in the art. Therefore, unless such changes and modifications depart from the scope of the present invention, they should be construed as being included therein.

What is claimed is:

1. A process for the application of a nonadhesive insulating tape to the winding of an electric coil, in particular, as an intermediate, cover and/or shielding insulation, comprising the steps of:
  drawing off a first piece of a tape adhesively coated on one side from a first supply roll;
  bonding a free end of said first piece to an oncoming end of an insulating tape drawn from a second supply roll;
  winding a predetermined number of turns of said insulating tape onto the coil;
  cutting the insulating tape at a second end and attaching a previously cut end of a second piece of the adhesive tape to said second end; and,
  winding said second piece of the adhesive tape around the coil to secure the insulating tape, whereby the first piece of adhesive tape is initially applied to the coil and cut, while leaving said free end, so that at least one nonadhesive insulating tape can be adhesively bonded to said free end, wound onto the coil, and adhesively bonded to the coil by introducing said second piece of adhesive tape onto the coil and continuing to rotate the coil.

2. The process according to claim 1, characterized in that the nonadhesive insulating tape is applied step by step, by means of said free end and said previously cut end of the adhesive tape, to the coil winding.

3. A process for the application of a nonadhesive insulating tape to the winding of an electric coil, in particular as an intermediate, cover and/or shielding insulation, comprising the steps of:
  drawing a single side adhesive tape from a supply roll;
  initially applying said adhesive tape to the coil;
  adhesively bonding said adhesive tape to an insulating tape drawn from a second supply roll: and,
  winding both tapes onto the coil together, whereby said insulating tape is cut after a predetermined length and wound completely onto the coil, and, upon further rotation of the coil, a protruding end of the adhesive tape is cut and secured to the coil.

4. Process according to claim 3, wherein several nonadhesive tapes are bonded to the adhesive tape in a mutually offset manner.

5. Process according to claim 4, wherein the nonadhesive insulating tapes are applied continuously to the coil winding, together with the adhesive tape.

6. Process according to claim 5, wherein plastic, metal or paper tapes are used as the nonadhesive insulating tapes.

7. Process for the application of a nonadhesive strip to a coil form of an electrical coil, comprising the steps of:
  drawing a first piece of a single sided adhesive tape from a first supply roll;
  conducting the first piece of adhesive tape from one side onto a first contact surface of a pressure head;
  moving said pressure head into a first working position relative to the coil, with said first contact surface against a completed winding of the coil to bond the first piece of adhesive tape to the coil;
  winding the first piece of adhesive tape onto the coil and subsequently cutting the adhesive tape while leaving one end free;
  subsequently moving the pressure head away from the coil into a rest position and further rotating the coil by one-half turn;
  moving a counter holder into contact with the nonadhesive side of the free end of the first piece of adhesive tape;
  subsequently moving a second contact surface of the pressure head, to which a nonadhesive insulating strip drawn from a second supply roll is applied from another side, into a second working position relative to the coil wherein said second contact surface is pressed against the counter holder to adhesively bond the nonadhesive insulating strip serving as intermediate, cover and/or shielding insulation to the free end of the adhesive tape;
  cutting an end the nonadhesive insulating strip following a winding of a predetermined number of turns of said nonadhesive insulating strip onto the coil;
  returning the pressure head to its first working position following the winding and subsequent cutting of the nonadhesive insulating strip such that the pressure head presses with its first contact surface against the coil to adhesively bond the end of the nonadhesive insulating strip to a second adhesive tape drawn from the first supply roll and resting on the second contact surface;

bonding said adhesive tape to the coil upon a further turn of said coil to secure the nonadhesive insulating strip; and cutting said second adhesive tape.

8. Process according to claim 7, wherein said step of winding and cutting the first piece of adhesive tape includes displacing a blade located in the first contact surface of the pressure head and said step of cutting the nonadhesive insulating strip includes displacing a blade located in the second contact surface of said pressure head.

9. Process according to claim 7, wherein said step of conducting the first piece of adhesive tape includes drawing the first piece from the first supply roll over a tension relief device to the pressure head.

10. Process for the application of a nonadhesive insulating strip to the winding of an electrical coil, in particular as intermediate, cover and/or shielding insulation, comprising the steps of:

drawing a piece of a single adhesive tape from a first supply roll and applying said piece of adhesive tape to a first contact surface of a first pressure head;

moving said first pressure head from its rest position into a working position, in which it adhesively bonds the piece of adhesive tape to the winding of the coil;

drawing a nonadhesive insulating strip from at least one second supply roll and bringing said nonadhesive insulating strip to a support surface of a second pressure head, which is then displaced from its rest position into a first working position, in which it bonds the nonadhesive insulating strip to the adhesive tape;

winding the piece of adhesive tape together with the nonadhesive insulating strip onto the coil;

subsequently pivoting t he second pressure head into a second working position and cutting an end of the nonadhesive insulating strip;

further winding the end of the insulating strip onto the coil with the piece of adhesive tape; and, cutting the piece of adhesive tape and winding a projecting end of the adhesive tape onto the coil.

11. Process according to claim 10, further comprising the steps of bringing said piece of adhesive tape to the first pressure head through a tension relief device and, holding said piece of adhesive tape by suction on the first contact surface.

12. Process according to claim 10, wherein said step of cutting the piece of adhesive tape includes displacing a blade located in the first pressure head, and said step of cutting the nonadhesive insulating strip includes displacing a blade located in the second pressure head.

13. Process according to claim 12, further comprising the step of pivoting the second pressure head for the cutting of the nonadhesive insulating strip in a manner such that a sliding surface of the second pressure head moves to a position previously occupied by the support surface.

14. Process according to claim 10, further comprising the steps of bonding each of a plurality of nonadhesive insulating strips by associated pressure heads to the piece of adhesive tape in a mutually offset manner.

15. Process according to claim 10, wherein plastic, metal or paper strips are used as the nonadhesive insulating strip.

* * * * *